(12) United States Patent
Koeniger et al.

(10) Patent No.: US 7,441,956 B2
(45) Date of Patent: Oct. 28, 2008

(54) LINEAR GUIDE/FEED MODULE WITH GUIDE BODY AND BOOM FOR IT

(75) Inventors: Berthold Koeniger, Werneck (DE); Gerd Spatschek, Mellrichstadt (DE); Josef Dirschbacher, Knetzgau (DE)

(73) Assignee: Rexroth Star GmbH, Schweinfurt (DE)

( * ) Notice: Subject to any disclaimer, the term of this patent is extended or adjusted under 35 U.S.C. 154(b) by 345 days.

(21) Appl. No.: 11/256,742

(22) Filed: Oct. 24, 2005

(65) Prior Publication Data
US 2006/0088232 A1      Apr. 27, 2006

(30) Foreign Application Priority Data
Oct. 25, 2004    (DE) ................. 10 2004 051 829

(51) Int. Cl.
*F16C 29/06*     (2006.01)
*F16H 25/22*     (2006.01)
(52) U.S. Cl. ................. 384/45; 384/43; 74/89.32; 74/89.34
(58) Field of Classification Search ............ 384/7, 384/15, 43–57; 74/89.32, 493–492
See application file for complete search history.

(56) References Cited

U.S. PATENT DOCUMENTS

| | | | | |
|---|---|---|---|---|
| 3,353,875 | A | * | 11/1967 | Karge ............. 384/45 |
| 4,304,443 | A | | 12/1981 | Hoffmann |
| 4,339,157 | A | | 7/1982 | Olschewski et al. |
| 4,615,569 | A | * | 10/1986 | Hirata ............. 384/45 |
| 4,693,131 | A | * | 9/1987 | Teramachi ........... 74/89.32 |
| 5,076,714 | A | | 12/1991 | Teramachi |
| 5,097,716 | A | | 3/1992 | Barbat et al. |
| 5,273,381 | A | | 12/1993 | Shirai |
| 6,402,381 | B1 | | 6/2002 | Shirai et al. |
| 6,474,868 | B2 | * | 11/2002 | Geyer et al. ......... 384/49 |
| 6,700,228 | B2 | | 3/2004 | Teramachi et al. |
| 6,802,781 | B2 | | 10/2004 | Schwarzler et al. |
| 6,942,386 | B2 | * | 9/2005 | Weissflog ........... 384/47 |
| 6,948,401 | B2 | * | 9/2005 | Zernickel et al. ...... 74/493 |

(Continued)

FOREIGN PATENT DOCUMENTS

CH          315948          9/1956

(Continued)

*Primary Examiner*—Marcus Charles
(74) *Attorney, Agent, or Firm*—Michael J. Striker

(57) ABSTRACT

A linear guide/feed module has a tubular boom movable along a movement axis, a housing encompassing the tubular boom so that the boom is travelable out of and into the housing along the movement axis, a drive unit for driving the boom to move in relation to the housing, at least two recirculating rolling element rows supporting the boom in the housing for its movement in relation to the housing along the movement axis and spaced apart from each other in a circumference direction around the movement axis, with each of the recirculating rolling element rows having a force-loaded rolling element carrying segment extending essentially in a direction of the movement axis and an essentially unloaded rolling element return segment, and a guide body encompassing the boom at least in segments in the circumferential direction, provided in the housing and having rolling element passages of the rolling element return segments formed into it as well as raceways on a housing side of the rolling element carrying segments of the at least two rolling element rows.

23 Claims, 2 Drawing Sheets

U.S. PATENT DOCUMENTS

| | | | |
|---|---|---|---|
| 7,241,047 B2 * | 7/2007 | Bauer | 384/15 |
| 2001/0024535 A1 * | 9/2001 | Keller | 384/7 |

FOREIGN PATENT DOCUMENTS

| | | |
|---|---|---|
| CH | 315948 | 10/1956 |
| DE | 931 019 | 7/1955 |
| DE | 3308537 | 10/1984 |
| DE | 8712696 | 12/1987 |
| DE | 4135167 | 5/1992 |
| DE | 69014502 | 7/1995 |
| DE | 19817290 | 10/1999 |
| DE | 10158544 | 7/2003 |
| EP | 0367196 | 5/1990 |
| EP | 0907456 | 4/1999 |
| EP | 0767526 | 10/2002 |
| JP | 03014907 | 1/1991 |
| JP | 05172138 | 7/1993 |
| JP | 09250541 | 9/1997 |
| JP | 11201161 | 7/1999 |
| WO | 97/45230 | 12/1997 |

* cited by examiner

LINEAR GUIDE/FEED MODULE WITH GUIDE BODY AND BOOM FOR IT

CROSS-REFERENCE TO A RELATED APPLICATION

The invention described and claimed hereinbelow is also described in German Patent Application DE 10 2004 051 829.7 filed on Oct. 29, 2004. This German Patent Application provides the basis for a claim of priority of invention under 35 U.S.C. 119(a)-(d).

BACKGROUND OF THE INVENTION

The present invention relates to a linear guide/feed module having a tubular boom that can be moved along a movement axis, having a housing that encompasses the tubular boom, which housing the boom can travel out of and into along the movement axis, and having a drive unit that drives the boom to move in relation to the housing; for its movement along the movement axis relative to the housing, the boom is supported in the housing by means of at least two recirculating rolling element rows that are spaced apart from each other in the circumference direction around the movement axis; each of these recirculating rolling element rows has a force-loaded rolling element carrying segment extending essentially in the direction of the movement axis and an essentially unloaded rolling element return segment.

The present invention also relates to a boom for such a linear guide/feed module and a method for manufacturing it.

A species-defining feed module with a linear guide is known, for example, from DE 87 12 696 U1 or from EP 0 907 456 B1.

DE 87 12 696 U1 has disclosed a linear guide/feed module having a tubular housing into which a boom is coaxially inserted in such a way that it can move in relation to the housing. A threaded spindle drives the boom to travel into and out of the housing in the direction of the movement axis. Hollow cylindrical shell segments are mounted in the housing by means of positioning pins and screws. Radially extending support surfaces of the hollow cylindrical shell segments have roller recirculation shoes attached to them, each of which contains a recirculating rolling element row.

On the side of the boom oriented away from the hollow cylindrical segment, the boom is supported on these roller recirculation shoes with corresponding support surfaces that likewise extend in the radial direction.

EP 0 907 456 B1 has also disclosed a linear guide/feed module that can be viewed as species-defining. The feed module known from this patent application has a boom and a coaxial housing encompassing the boom. Prefabricated recirculating ball units with two carrying segments each are inserted into recesses in the housing and screw-mounted there in the same way as the roller recirculation shoes in the above-mentioned DE 87 12 696 U1. With reference to the housing center axis that coincides with the movement axis, the recirculating ball units protrude radially from the housing into the cavity that contains the boom. There are four recirculating ball units offset from one another by a 90° angle in the circumference direction. The boom is guided on the carrying segments of these recirculating ball units so that it can move in relation to the housing in the direction of the movement axis.

A disadvantage of the linear guide/feed modules mentioned above is the high cost of assembly required to achieve a precise alignment of the individual recirculating ball units and roller recirculation shoes. These prefabricated recirculating units must be adjusted both in terms of how parallel they are to the desired movement axis and in terms of the degree to which they exert a preloading force on the boom.

As further prior art, reference is also made to EP 0 767 526 B1, which has disclosed a linear guide/feed module in which the boom is guided so that it can move in the direction of the movement axis inside the housing encompassing it by means of a slideway instead of a rolling element guide. The slideway between the housing and boom is embodied according to EP 0 767 526 B1 in the form of a wedge profile in order to simultaneously prevent the boom from rotating in relation to the housing. A disadvantage of this design, though, is the powerful forces required to move the boom in relation to the housing due to the presence of the slideway.

As further prior art, reference is also made to the patent application U.S. Pat. No. 6,700,228 B2, which has disclosed a linearly guided carriage driven by a linear motor. This carriage is supported so that it can move in the guidance direction by means of recirculating rolling element rows situated on opposite side walls in a U-shaped carrier.

Finally, reference is made to patent application CH-A-315948, which has disclosed a peening discussed below as a method for manufacturing tubes with a desired inner contour that deviates from a smooth cylindrical form, e.g. barrel.

SUMMARY OF THE INVENTION

Due to the above-mentioned disadvantages of the prior art, one object of the present invention is to create a linear guide/feed module, which can be manufactured by means of an assembly that is simpler than those of the prior art.

This object is attained according to the present invention by means of a linear guide/feed module in which a guide body, which encompasses the boom at least in segments in the circumference direction, is provided in the housing and has rolling element passages for the rolling element return segments formed into it as well as the raceways on the housing side of the rolling element carrying segments of the at least two rolling element rows.

According to the present invention, several recirculating rolling element rows are accommodated in a single guide body. Consequently, the raceways on the side closer to the housing can be provided in the guide body so that they no longer require adjustment. It is instead sufficient to provide the raceways in the desired orientation in the guide body, which is significantly easier to achieve during production of the guide body than during the assembly of individual recirculating rolling element units.

Preferably, the guide body is produced in a single clamping setup, which assures the greatest possible positioning accuracy of raceways of the different rolling element rows in the guide body.

The raceways on the housing side of the rolling element carrying segments can either be embodied directly in the guide body or raceway inserts on which the rolling elements roll can be attached to the guide body. In the latter case, the recesses for the raceway inserts in the guide body must be produced with a sufficient degree of precision for the raceway inserts to assume the desired position and orientation once attached to the guide body.

In a guide body with raceway inserts, it is also true that the precisely positioned production of corresponding recesses for raceway inserts costs less than a precisely positioned assembly of individual recirculating rolling element units.

In order to achieve a high degree of guide rigidity when using only a single guide body, it is advantageous if the guide body has a U-shaped cross section viewed in an intersecting plane orthogonal the movement axis, the raceways on the housing side of the rolling element carrying segments being provided in end regions of the freely extending legs of the U-shaped cross section. In this structural design, the at least two rolling element carrying segment raceways can be spaced a sufficient distance apart from each other in the circumference direction so that the boom can be guided in the housing with a sufficient amount of preloading.

It is possible to provide more than two recirculating rolling element rows in order to absorb particularly powerful guidance forces and achieve a high-precision guidance. Since space considerations on the outside of the boom preclude the possibility of providing rolling element raceways at arbitrary locations on the boom, preferably at least two adjacent rolling element rows are combined to form a rolling element row unit. The rolling element rows of a rolling element row unit have essentially parallel rolling element recirculation paths. In a particularly preferable embodiment, exactly two recirculating rolling element rows are combined to form a rolling element row pair since this makes it possible to absorb even very powerful guidance forces in a very narrow, limited space.

The best possible preloading of the boom guided by the rolling element rows and a particularly favorable absorption of guidance forces in two directions orthogonal both to each other and to the direction of the movement axis can be advantageously achieved if the spacing in the circumference direction between two rolling element rows or two rolling element row units lies between 145° and 225°, preferably between 160° and 200°, and particularly preferably, is approximately 180°. It is also possible to manage with only one guide body in an axial segment of the linear guide/feed module.

According to one embodiment form of the present invention, the guide body can be embodied as integral to the housing. However, the integral embodiment of the guide body and housing sometimes complicates the machining of the guide body, primarily with regard to the rolling element passages, raceways, and raceway recesses. It is therefore preferable for the guide body to be embodied as separate from the housing. To facilitate alignment of the guide body in relation to the housing, the guide body can have an alignment geometry, which, in the assembled state of the feed module, cooperates with a counterpart alignment geometry of the housing to fix the position of the guide body, at least in the circumference direction, and to orient the guide body in relation to the movement axis.

When a separate guide body is provided, it is necessary to take into account the fact that in order to accommodate the guide body, the cavity of the housing that accommodates the boom and the guide body must be enlarged in comparison to a housing of the prior art or a housing that has a guide body integrated into it. This enlarged cavity in the housing reduces the housing rigidity. It has, however, surprisingly turned out that the assembly simplification with a simultaneously increased guidance precision achieved by the guide body more than outweighs the reduced housing rigidity. The inventors of the present invention have therefore had the good fortune of circumventing the above-mentioned limitations.

By simply resting against each other, the alignment geometry and the counterpart alignment geometry can assure a desired position and orientation of the guide body. From a structural and production engineering standpoint, the linear guide/feed module can be embodied in a particularly simple fashion in that the alignment geometry and the counterpart alignment geometry can each have at least two, preferably essentially flat, contact surfaces or counterpart contact surfaces, which are angularly offset from each other around an angular offset axis parallel to the movement axis, the two contact surfaces and two counterpart contact surfaces preferably enclosing a right angle.

In a preferred embodiment form of the present invention, the boom can be comprised of aluminum to reduce weight. To reduce wear, raceway inserts can advantageously be used, which are made of wear-resistant material, for example steel, in particular hardened steel or hard metal and the like. Raceway inserts of this kind are known, for example, from U.S. Pat. No. 5,097,716 A (or from the family member EP 0 367 196 A2), the full content of whose disclosure relating to raceway inserts should be included in the present application. The disclosure of the German patent application DE 10 2004 018820, to the extent that it relates to raceway inserts, should also be included in its entirety in the present application. It demonstrates quite particularly advantageous embodiment forms of raceway inserts.

If highly rigid feed modules are desired, then the guide body can also be made of steel.

A particularly compact design of a linear guide/feed module that is also highly rigid can be achieved if the boom encloses at least a section of a movement output part of the drive mechanism. In addition, this design makes it possible to transmit drive force from the movement output part to the boom essentially without the occurrence of any bending moments.

In a modification of the present invention, it is basically conceivable to use a piston/cylinder unit as the drive device. But because of the higher boom positioning accuracy that can be achieved, the drive device is preferably an electric motor, particularly preferably, a digitally controllable electric motor. Since linear motor drive units cannot as a rule be used in linear guide/feed modules of the type described here due to the lack of available space, a movement of the boom along the movement axis can be achieved if in addition to the electric motor, the drive device also includes a device that converts a rotating motion into a linear translatory motion. This can, for example, be a ball-type linear drive, which has a proven track record in feed modules of the type discussed here. Besides this, though, it is also conceivable to use other such devices, for example a rack and pinion transmission or the like.

If the drive device is a ball-type linear drive and if its spindle is encompassed by the boom to achieve a design that is as compact as possible, i.e. one that is short in the direction of the movement axis, with the spindle protruding different depths into the boom depending on the movement position of the boom, then in order to extend the service life of the ball-type linear drive, it can be protected from an undesired bending load by having the longitudinal end of the spindle oriented away from the motor be supported by a slider against an inner circumference surface of the boom. The slider can then slide against the inner circumference surface of the boom in the direction of the movement axis.

In addition to or as an alternative to the above-mentioned increase in rigidity through suitable material selection for the manufacture of the guide body, the rigidity of the entire linear guide/feed module can also be increased by using a plurality of guide bodies situated spaced apart from one another in the direction of the movement axis.

By designing the boom with a profile that is closed when viewed in a section orthogonal to the movement axis, the boom can be produced with a high flexural strength and primarily, with a high torsional stiffness. For applications in which low or medium forces are to be exerted on the boom when it is fully extended from the housing, an aluminum boom can suffice. A particularly high rigidity is achieved, though, when the boom is made of steel. The strains on the boom are also generated by the guide preloading, which can be powerful because the guide body has a closed profile. A powerful preloading results in an advantageously increased guide rigidity.

Particularly with frequently occurring torsional strains on the boom, an advantageously homogeneous distribution of the load on the boom over its circumference around the movement axis can be achieved if the boom has an essentially constant wall thickness in the circumference direction.

To support the above-mentioned slider, which in turn supports the free spindle end of a ball-type linear drive, the boom can have an inner circumference surface that is cylindrical, at least in sections, in the circumference direction. In this case, the then preferably essentially cylindrical slider can slide in relation to the inner circumference surface of the boom not only in the direction of the movement axis, but also in the circumference direction. In addition, with cylindrical sliders, no particular mounting position has to be taken into account during installation. It is enough for the cylinder axes of the inner circumference surface and the slider to merely coincide with each other. The slider can be designed so that it is able to rotate around the rotation axis of the spindle of the ball-type linear drive as described in DE 33 08 537 C1, whose disclosure relating to the slider should be fully included in the current application.

To facilitate the highly precise finishing of rolling element raceways on the boom side, it is advantageous if the boom has at least two essentially flat contact surfaces that are preferably parallel to each other. These contact surfaces can be used to clamp the boom in a finishing machine. The boom to be finished can be clamped in a particularly simple fashion if the at least two essentially flat contact surfaces are provided on the outer circumference of the boom.

For the production of the above-described essentially flat contact surfaces and the roller element raceways on the boom side, as a rule, the boom has material thickenings in order for there to be enough available material to provide for the geometries such as the raceway and contact surface through the use of material-removing methods. Despite these material thickenings, the boom can have the above-described advantageous, essentially constant material thickness in the circumference direction if it has recesses extending in the radial direction in relation to the movement axis and in the direction of the movement axis. In addition, these recesses, together with the material protrusions embodied essentially in the same circumferential positions on the outer circumference of the boom, form ribs extending in the longitudinal direction of the boom, which additionally contribute to increasing the flexural strength of the boom.

A boom of the type described above can be manufactured in a particularly advantageous way by means of a so-called peening process of the kind described in patent application CH 315948 A. If steel is used as the material for the boom, then this peening process additionally strengthens the boom, further increasing its rigidity. Alternatively, a drawn steel full profile could be used, which is then drilled. The recesses on the inner circumference surface could then be omitted.

Due to its outstanding rigidity and strength properties and due to its ease of manufacture, a boom manufactured by means of a peening process adds particular value to a linear guide/feed module so that separate protection is sought for a boom of this kind.

More precisely stated, an advantageous boom for a linear guide/feed module, in particular with the above-described additional features, can manufactured with a method according to which a peening process is used to transform a boom a blank into a form close to its final contour. "Close to its final contour" means that the unfinished boom obtained after the peening can remain essentially unfinished except for the raceways, which influence the guidance precision, and possibly the essentially flat contact surfaces. After the peening, at least one, but preferably at least two, particularly preferably exactly two, flat contact surfaces are produced on the unfinished boom, for example by means of machining processes. The essentially flat contact surfaces then permit an even clamping setup of the unfinished boom for the machining of the raceways on the boom side. Grinding processes have turned out to be particularly suitable for producing raceways.

In addition to the above-mentioned process steps, the method according to the present invention for manufacturing a boom can include additional process steps, for example an inductive hardening of the raceway regions.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
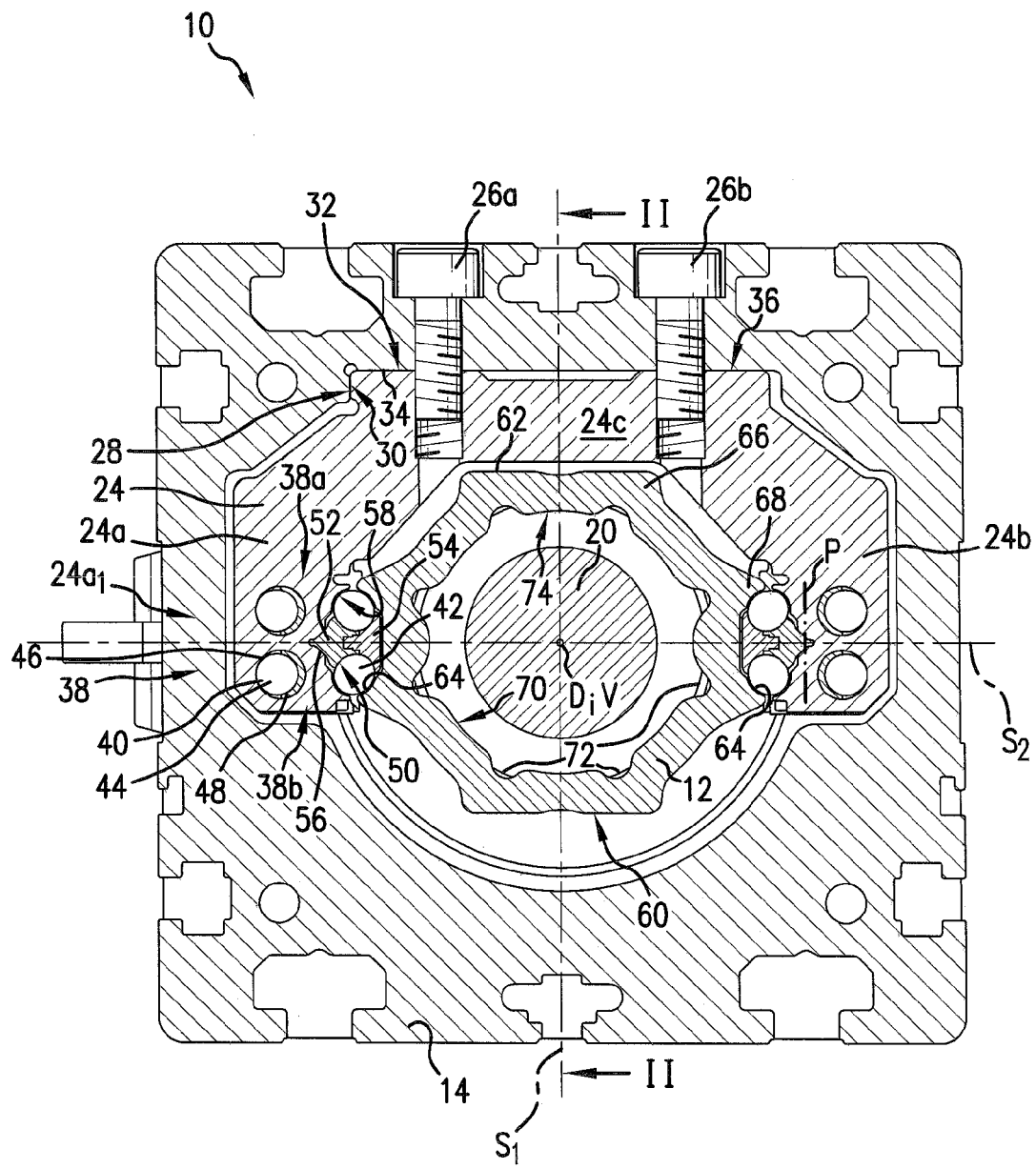
FIG. 1 shows a cross section, orthogonal to the movement direction, through an embodiment form of a linear guide/feed module according to the present invention.
Figure 2:
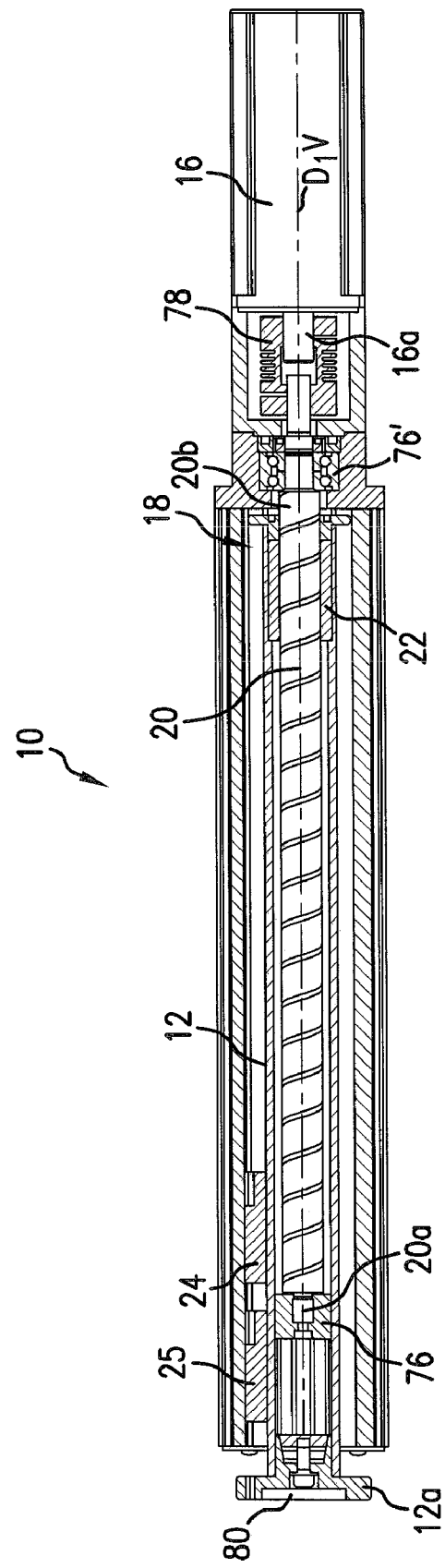
FIG. 2 shows a longitudinal section through the linear guide/feed module from FIG. 1, along the plane II-II indicated in FIG. 1.

In FIGS. 1 and 2, a linear guide/feed module is labeled as a whole with the reference numeral 10. The linear guide/feed module 10 has a boom 12, a housing 14, an electric motor 16 (see FIG. 2), and a ball-type linear drive 18.

The ball-type linear drive 18 has a spindle 20, and a nut 22, which encompasses the spindle 20 and is rigidly coupled to the boom 12 in a force-transmitting and movement-transmitting manner. The rotation axis D of the spindle 20 of the ball-type linear drive 18 coincides with the movement axis V along which the boom 12 can be extended out of and retracted into the housing 14. The movement axis V is oriented orthogonal to the plane of the drawing in FIG. 1 and lies in the plane of the drawing in FIG. 2. The axes D and V thus constitute a central axis of the boom 12.

The housing 14 completely encompasses the boom 12 in the circumference direction around the movement axis V, i.e. both the boom 12 and the housing 14 have a closed profile in a sectional view orthogonal to the movement axis V. The housing 14 is embodied in the form of an extrusion molded aluminum profile.

A separate guide body 24 is provided in the housing 14 and is fastened by means of screws 26a and 26b. As is clear from FIG. 2, in order to increase the guide rigidity in the direction of the movement axis V, an additional guide body 25 is provided, which is spaced apart from and identical to the guide body 24. In an assembled state of the linear guide/feed module, the guide body 24 rests with a first flat contact surface 28 against a first flat counterpart contact surface 30 of the housing 14. The guide body 24 also rests with a second flat contact surface 32 against a second flat counterpart contact surface 34 of the housing 14. The first and second contact surfaces 28 and 32 are offset from each other at right angles. The first and second counterpart contact surfaces 30 and 34 also enclose a right angle. The contact surfaces 28 and 32 and the counterpart contact surfaces 30 and 34 extend orthogonal to the plane of the drawing in FIG. 1.

The guide body 24 also has a third essentially flat contact surface 36, which likewise rests against the second counterpart contact surface 34. This support makes it very easy to definitely fix the guide body 24 in its position in relation to the housing 14 and in its orientation in relation to the movement axis V.

The guide body 24 with the U-shaped cross section has two freely extending legs 24a and 24b, which are connected to each other by a base 24c. While the contact surfaces 28, 32, and 36 are provided on the base 24c, recirculating rolling element circuits are provided in the legs 24a and 24b. Since the guide body 24 is essentially mirror symmetrical in relation to a symmetry plane $S_1$ extending orthogonal to the base 24c and containing the movement axis V, only the freely extending leg 24a shown on the left in FIG. 1 will be described below. Its description, however, can be applied to the freely extending leg 24b shown on the right in FIG. 1, taking into account the mirror symmetry.

The boom 12 is also essentially mirror symmetrical in relation to the symmetry plane $S_1$. In addition, the boom 12 is also mirror symmetrical in relation to a symmetry plane $S_2$ that is orthogonal to the symmetry plane $S_1$ and likewise contains the movement axis V. The boom 12 will therefore be chiefly described only with regard to its side that cooperates with the leg 24a; this description can also be applied to the side that cooperates with the other leg 24b of the guide body 24, taking into account the above-mentioned symmetrical conditions.

At the free end region $24a_1$ of the freely extending leg 24a, which is shown on the left in FIG. 1 and belongs to the guide body 24 encompassed by the housing 14, a rolling element row pair 38 is provided, which has two recirculating rolling element rows 38a and 38b with essentially parallel recirculation paths. The recirculating rolling element rows 38a and 38b are situated essentially mirror symmetrical in relation to the plane $S_2$ so that it is sufficient to describe the recirculating rolling element row 38b shown at the bottom in FIG. 1. By taking into account the above-mentioned symmetry conditions, its description can also be applied to the recirculating rolling element row 38a shown at the top in FIG. 1 as well as to the rolling element rows in the leg 24b.

The lower row of rolling elements 38b has rolling elements in the form of balls 40 and has a carrying ball segment 42 and a return ball segment 44. At both longitudinal ends of the carrying ball segment 42 and the return ball segment 44 in the direction of the movement axis V, ball reversing segments are provided, not shown in FIG. 1, which transfer balls from the carrying segment 42 to the return segment 44 or from the return segment 44 to the carrying segment 42.

To form the return segment 44, the end region $24a_1$ of the leg 24a of the guide body 24 has a passage 46 whose diameter is larger than that of the balls 40 that travel in it. In addition, the passage 46 contains a plastic travel shell 48, which permits the balls 40 traveling essentially without load in the return segment 44 to move without play in the direction of the movement axis V.

The guide body 24 shown in the exemplary embodiment in FIGS. 1 and 2 is made of aluminum for weight reasons. The ball raceways 50 on the guide body side or housing side are therefore embodied on raceway inserts 52 made of steel, in particular hardened steel, to increase wear resistance. Raceway inserts of this kind are known, for example, from EP 0 367 196 A2, in particular from FIG. 8 therein, the full content of whose description, insofar as it relates to raceway inserts and their attachment to guide bodies, should be included in the present application and be taken into account here.

A stay 54 holds the balls 40 of the carrying segment 42 against the guide body 24 and prevents them falling out. Intrinsically known means not shown in the drawing secure the stay 54 to the guide body 24 forward of and behind the plane of the drawing in FIG. 1. The raceway inserts 52 can, as described in EP 0 367 196 A2, be contained in the V-groove 56, which is provided in the guide body 24 to accommodate the raceway inserts 52, in a way that permits them to rock around a rocking axis P extending orthogonal to the plane $S_2$. For the sake of clarity, the rocking axis P is marked on the freely extending leg 24b of the guide body 24 shown on the right in FIG. 1.

The guide body 24 carries all of the recirculating rolling element rows 38a, 38b, etc. guiding the boom 12. During the manufacture of the guide body 24, after a guide body blank has been formed into the desired U-shape, first the contact surfaces 28, 32, and 36 are produced, which serve as reference planes for the remainder of the production process. This is practical because as the guide body is being subsequently mounted in the housing 14, these contact surfaces 28, 32, and 36 serve to define its position and orientation in the housing 14 in cooperation with the counterpart contact surfaces 30 and 34.

After the reference surfaces 28, 32, and 36 have been produced, then the ball passages (through conduits) 46 are produced, for example by means of boring; this clamping setup is also used for the production of the contours—for example the fluted surface 58 in the guide body for accommodating the balls 40 of the carrying segment 42 and the V-groove 56 for accommodating the raceway insert 52—through suitable production processes such as milling, grinding, planing, etc. This can thus advantageously take place in a single clamping setup so that the four recirculating rolling element rows can be positioned on the guide body 24 with a high degree of positioning accuracy in relation to one another. For this reason, the guide body 24 can be easily inserted into the housing 14 by means of the contact surfaces 28, 32, and 36, without further adjustment work; after the guide body 24 is mounted in the housing 14, the recirculating rolling element rows are situated in the desired position and in the desired orientation in relation to the movement axis V, without requiring further adjustment work.

The boom 12 is produced by means of a peening process, starting from a tubular blank. The peening process is explained in detail in the patent application CH 315948 A, which is expressly included herein by reference.

After the peening, the boom 12 essentially has the form shown in FIG. 1, but the function surfaces have not yet been machined. After the peening, then the opposing, essentially parallel, flat surfaces 60 and 62 are machined. These surfaces 60 and 62 serve as reference and clamping surfaces for the subsequent machining of the boom 12. The surfaces 60 and 62 permit an even clamping setup of the boom 12 for the subsequent machining of the raceways 64 on the boom side (seethe right half of the boom 12 in FIG. 1) for the carrying segments 42 of the recirculating rolling element rows. These raceway segments 64 on the boom side are preferably produced by means of grinding.

Material aggregations, for example the material aggregation 66 or the material aggregation 68, are initially provided on the circumference of the boom 12 for the formation of the surfaces 60 and 62 and raceway segments 64. These material aggregations assure that there is enough material present for a machining of the boom.

But since a material thickness that is essentially constant in the circumference direction around the movement axis V is advantageous for a peening of the boom 12 and a material thickness that is essentially constant in circumference direction of the boom 12 is also advantageous for stresses that develop in the boom under torsional load, grooves 72 are provided on the inner circumference 70 of the boom 12 in the region of the material aggregations 66 and 68, which grooves extend into the boom 12 in the radial direction with reference to the movement axis V and also extend in the direction of the movement axis V.

These grooves 72, in cooperation with the material aggregations 66 and 68 at which they are formed, also provide the boom 12 with a ribbing that increases its flexural strength. In the circumference direction between the grooves 72, of which only three are provided with reference numerals for the sake of clarity, the inner circumference 70 of the boom 12 has cylindrical segments 74. These permit a particularly low-loss accommodation and relative movement of a slider 76 (see FIG. 2), which accommodates and supports a longitudinal end 20a of the spindle 20 of the ball-type linear drive 18, which end 20a is farther away from the motor. The spindle 20 can rotate around the rotation axis D in relation to the slider 76. Since a rotation of the spindle 20 produces a movement of the boom 12 in the direction of the movement axis V, the boom 12 simultaneously slides in relation to the slider 76 in the direction of the movement axis V.

The provision of an inner circumference surface that is cylindrical at least in segments on the inner circumference 70 of the boom 12 permits a slider 76 with a cylindrical outer wall to be used, which is particularly simple to install because no specific angular orientation between the slider 76 and the boom 12 need be taken into account.

As is also clear from FIG. 2, the longitudinal end 20b of the spindle 20 closer to the motor is supported with a roller bearing 76' so that it can rotate around the rotation axis D. The spindle 20 is also drive-connected to the output shaft 16a of the electric motor 16 by means of a shaft/hub connection 78.

At a longitudinal end 12a of the boom protruding from the housing 14, a mounting plate 80 can be provided to which functional units can be attached that can be moved with the boom 12.

It will be understood that each of the elements described above, or two or more together, may also find a useful application in other types of constructions differing from the types described above.

While the invention has been illustrated and described as embodied in a linear guide/feed module with guide body and boom for it, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A linear guide/feed module, comprising a tubular boom movable along a movement axis; a housing encompassing said tubular boom so that said boom is travelable out of and into said housing along said movement axis; a drive unit for driving said boom to move in relation to said housing; at least two recirculating rolling element rows supporting said boom in said housing for its movement in relation to said housing along said movement axis and spaced apart from each other in a circumference direction around said movement axis, each of said recirculating rolling element rows having a force-loaded rolling element carrying segment extending essentially in a direction of said movement axis and an essentially unloaded rolling element return segment; a guide body encompassing said boom at least in segments in the circumferential direction, said guide body being provided in said housing and having rolling element passages of said rolling element return segments formed into said guide body as well as raceways on a housing side of said rolling element carrying segments of said at least two rolling element rows.

2. A linear guide/feed module as defined in claim 1, wherein said guide body has a U-shaped cross-section viewed in an intersecting plane orthogonal to said movement axis, said raceways on said housing side of said rolling element carrying segments being provided in end regions of freely extending legs of said U-shaped cross-section.

3. A linear guide/feed module as defined in claim 1, wherein more than two of said recirculating rolling element rows are provided.

4. A linear guide/feed module as defined in claim 3, wherein at least two adjacent ones of said recirculating rolling element rows are combined to form a rolling element row unit, forming a rolling element row pair and having essentially parallel rolling element recirculation paths.

5. A linear guide/feed module as defined in claim 4, wherein a spacing in the circumference direction between said two rolling element rows or two rolling element row units lies between 145° and 225°.

6. A linear guide/feed module as defined in claim 5, wherein said spacing in the circumference direction lies between 160° and 200°.

7. A linear guide/feed module as defined in claim 5, wherein said spacing in the circumference direction is substantially 180°.

8. A linear guide/feed module as defined in claim 1, wherein said guide body is configured as separate from said housing and has an alignment geometry which, in an assembled state of the feed module, cooperates with a counterpart alignment geometry of said housing to fix a position of said guide body at least in the circumference direction and to orient said guide body in relation to said movement axis.

9. A linear guide/feed module as defined in claim 8, wherein said alignment geometry and said counterpart alignment geometry each have at least two contact surfaces or counterpart contact surfaces, which are angularly offset from each other around an angular offset axis parallel to said movement axis.

10. A linear guide/feed module as defined in claim 9, wherein said at least two contact surfaces are configured as flat surfaces.

11. A linear guide/feed module as defined in claim 9, wherein said at least two contact surfaces and two counterpart contact surfaces each enclose a right angle.

12. A linear guide/feed module as defined in claim 1, wherein said boom encloses at least a section of a movement output part of said drive unit.

13. A linear guide/feed module as defined in claim 1, wherein said drive unit includes an electric motor provided with a device that converts a rotating motion into a linear translatory motion.

14. A linear guide/feed module as defined in claim 13, wherein said device is a ball-type linear drive.

15. A linear guide/feed module as defined in claim 1, wherein said drive unit includes a ball-type linear drive with a spindle protruding into said boom, said spindle having a longitudinal end which is oriented away from a motor and is supported by a slider on an inner circumferential surface of said boom.

16. A linear guide/feed module as defined in claim 1, wherein a plurality of said guide bodies are provided and spaced axially apart from one another in a direction of said movement axis.

17. A linear guide/feed module as defined in claim 1, wherein said boom has a profile that is closed when viewed in a section orthogonal to said movement axis.

18. A linear guide/feed module as defined in claim 17, wherein said boom is composed of steel.

19. A linear guide/feed module as defined in claim 1, wherein said boom has a substantially constant wall thickness in the circumference direction.

20. A linear guide/feed module as defined in claim 1, wherein said boom has an inner circumferential surface that is cylindrical at least in sections in the circumference direction.

21. A linear guide/feed module as defined in claim 1, wherein said boom has at least two substantially flat contact surfaces.

22. A linear guide/feed module as defined in claim 21, wherein said substantially flat contact surfaces are provided on an outer circumference of said boom.

23. A linear guide/feed module as defined in claim 21, wherein said boom has an inner circumference provided with recesses which extend in a radial direction in relation to said movement axis and extend in a direction of said movement axis.

* * * * *